(12) United States Patent
Hyson

(10) Patent No.: US 10,279,553 B2
(45) Date of Patent: May 7, 2019

(54) FIBRE REINFORCED POLYMER MATRIX COMPOSITE PIPES

(71) Applicants: Sigma Precision Components UK Limited, Sandiacre Nottingham (GB); Graeme Hyson, Milton Keynes (GB)

(72) Inventor: Graeme Hyson, Milton Keynes (GB)

(73) Assignee: Sigma Precision Components UK Limited, Nottingham (GB)

( * ) Notice: Subject to any disclaimer, the term of this patent is extended or adjusted under 35 U.S.C. 154(b) by 136 days.

(21) Appl. No.: 15/119,434

(22) PCT Filed: Feb. 18, 2015

(86) PCT No.: PCT/GB2015/050468
§ 371 (c)(1),
(2) Date: Aug. 17, 2016

(87) PCT Pub. No.: WO2015/124924
PCT Pub. Date: Aug. 27, 2015

(65) Prior Publication Data
US 2017/0066209 A1    Mar. 9, 2017

(30) Foreign Application Priority Data
Feb. 18, 2014    (GB) .................................. 1402891.4

(51) Int. Cl.
*B29D 23/00*    (2006.01)
*B29C 53/08*    (2006.01)
(Continued)

(52) U.S. Cl.
CPC ............ *B29D 23/001* (2013.01); *B29C 35/02* (2013.01); *B29C 53/083* (2013.01); *B29C 53/60* (2013.01);
(Continued)

(58) Field of Classification Search
CPC ...... B29C 53/60; B29C 53/581; B29C 70/081
(Continued)

(56) References Cited

U.S. PATENT DOCUMENTS 2,760,549 A * 8/1956 Nash ....................... B29C 53/60
156/149
3,068,134 A * 12/1962 Cilker ................... B29C 70/083
156/172
(Continued)

FOREIGN PATENT DOCUMENTS

GB    2 342 309    4/2000
GB    2 423 648    6/2009

OTHER PUBLICATIONS

International Search Report, PCT/GB2015/050468 (dated 2015).
Written Opinion of the International Searching Authority, PCT/GB2015/050468 (dated 2015).

*Primary Examiner* — Craig M Schneider
*Assistant Examiner* — David R Deal
(74) *Attorney, Agent, or Firm* — Walters & Wasylyna LLC

(57) ABSTRACT

A method of manufacturing a fluid impermeable rigid composite pipe (10) or hollow tube comprising the steps of:—a. providing a supporting mandrel (15) that is shaped to define a bore of the pipe (10); b. laying onto the outer circumferential surface of the mandrel (10) one or more first tapes (11) made of a thermoplastic material thereby to create a first region (11) that is predominantly thermoplastic material adjacent the bore of the pipe (10); c. providing a plurality of tows (14) that comprise co-mingled reinforcing fibers and thermoplastic filaments; d. weaving a plurality of the tows (14) to form one or more circular braids (13) and laying down the one or more of the circular braids (13) on to the first layer (11): to form a second region (12); e. applying to the outer surface of the second region (12) a heat-shrinkable (Continued)

layer (13); f. heating the product of steps (b) to (e) on the mandrel (15) to a first temperature at which the thermoplastic materials of the one or more tapes 11 and the tows 14 melt and the heat-shrinkable layer 13 shrinks radially inwards to consolidate the melted thermoplastic material to form a thermoplastic matrix in which the reinforcing fibers are embedded and a fluid impermeable thermoplastic rich region (11) is formed at the bore of the pipe (10); and, g. allowing the pipe (10) to cool to form a self supporting pipe (10).

9 Claims, 1 Drawing Sheet

(51) Int. Cl.

| | |
|---|---|
| *B29C 53/60* | (2006.01) |
| *B29C 61/02* | (2006.01) |
| *B29C 63/24* | (2006.01) |
| *B29C 70/32* | (2006.01) |
| *B29C 70/52* | (2006.01) |
| *B29C 70/08* | (2006.01) |
| *B29C 35/02* | (2006.01) |
| *B29C 53/58* | (2006.01) |
| *B29C 63/18* | (2006.01) |
| *B29C 61/00* | (2006.01) |
| *B29K 105/08* | (2006.01) |
| *B29L 23/00* | (2006.01) |

(52) U.S. Cl.
CPC ............ *B29C 61/025* (2013.01); *B29C 63/24* (2013.01); *B29C 70/081* (2013.01); *B29C 70/326* (2013.01); *B29C 70/528* (2013.01); *B29C 53/581* (2013.01); *B29C 61/006* (2013.01); *B29C 63/18* (2013.01); *B29C 70/08* (2013.01); *B29K 2105/08* (2013.01); *B29L 2023/22* (2013.01)

(58) Field of Classification Search
USPC .......................................................... 138/153
See application file for complete search history.

(56) References Cited

U.S. PATENT DOCUMENTS

| | | | | |
|---|---|---|---|---|
| 3,502,524 | A | | 3/1970 | Stanhope |
| 3,722,550 | A * | | 3/1973 | Matthews ............ F16L 11/085 138/137 |
| 3,918,499 | A | | 11/1975 | Higbee |
| 4,585,035 | A * | | 4/1986 | Piccoli .................. B29C 53/583 138/127 |
| 4,699,178 | A * | | 10/1987 | Washkewicz ............ D04C 1/06 138/125 |
| 5,225,021 | A * | | 7/1993 | Lona .................... B29C 37/0032 156/171 |
| 5,266,139 | A * | | 11/1993 | Yokota ................ B29C 53/8041 156/158 |
| 5,445,191 | A * | | 8/1995 | Green ................... F16L 11/086 138/124 |
| 6,240,971 | B1 * | | 6/2001 | Monette .................. F16L 9/147 138/134 |
| 6,626,211 | B2 * | | 9/2003 | Mizutani ................ B32B 25/10 138/126 |
| 7,950,420 | B2 * | | 5/2011 | Amma ...................... B32B 1/08 138/124 |
| 8,123,888 | B2 * | | 2/2012 | Hammami .......... B29C 53/8016 156/169 |
| 2002/0166595 | A1 * | | 11/2002 | Lindsay ................. A63B 53/10 138/153 |
| 2008/0072984 | A1 * | | 3/2008 | Branch ..................... B32B 1/08 138/124 |
| 2011/0041947 | A1 * | | 2/2011 | Shafer ..................... B29C 53/60 138/153 |
| 2011/0290366 | A1 * | | 12/2011 | Dewhirst ............. B29B 13/025 138/153 |
| 2012/0325363 | A1 * | | 12/2012 | Knebl .................. B29C 53/083 138/177 |

* cited by examiner

FIBRE REINFORCED POLYMER MATRIX COMPOSITE PIPES

This application is a U.S. national phase application of Intl. App. No. PCT/GB2015/050468 filed on Feb. 18, 2015, which claims priority from GB1402891.4 filed on Feb. 18, 2014. The entire contents of PCT/GB2015/050468 and GB1402891.4 are incorporated herein by reference.

THIS INVENTION relates to the fluid impermeable fibre reinforced polymer matrix composite pipes, methods of manufacturing such pipes, and the machines for bending and forming such composite pipes.

In this specification the term "composite pipe" refers to a pipe or hollow tube made from a thermoplastic matrix in which reinforcing fibres are embedded.

Within the aeronautical, marine and automotive industries, there is a need to be able to replace metal and metallic pipes with much lighter weight rigid pipes that are fluid impermeable even when conveying fluids at extremely high pressures. The present invention proposes novel fibre reinforced composite pipes that are not only fluid impermeable to prevent leakage of fluids within the pipe through the wall of the pipe, but are also impermeable to fluids permeating through the wall of the pipe into the bore of the pipe. In order to replace metal and metallic pipes in those applications where metal pipes are used, such composite pipes must have sufficient structural strength to be self-supporting and be impermeable so as to be totally interchangeable with metal or metallic pipes without impairing the strength or functionality of the pipe. Hitherto it is uncommon to make fibre-reinforced polymer matrix pipes that can be shaped and bent on a typical pipe-bending machine to assume shapes which are feasible with metal or metallic pipes.

Conventionally, circular braided fabrics are formed either as a hollow tubular structure without any internal support, or are formed by weaving the braiding threads on to a central temporary mandrel. In the present invention a temporary central supporting mandrel is used as will be explained hereinafter.

A conventional circular braiding machine typically consists of two sets of an even number of spools carrying the braiding yarns. One set of spools rotates about a common central axis in a clockwise direction whist the other set rotates about the same axis in an anticlockwise direction. Whilst revolving in opposite directions, the spools of each set are diverted to pass alternately inside and outside one or more of the threads of the other set, so that the braiding threads pass alternately under and over one or more of the threads of the other set. In this way, the two sets of braiding threads or yarns intersect, thus producing a tubular braid. Lengths of the braid are collected off the mandrel in a direction extending along the common axis of rotation of the two sets of spools. Circular braiders are often called "Maypole Braiders" since their motion is similar to the braiding formed on a maypole during a maypole dance. The helical angles of the threads that are laid up on the supporting mandrel determine the tightness or looseness of the weave formed during braiding.

There have been numerous proposals for manufacturing fibre reinforced flexible hoses such as water hosepipes and hydraulic hosepipes, but in the main these are not rigid enough to replace rigid metal pipes, and are not suitable for bending in a multi-axis pipe-bending machine of the type used for bending metal pipes to a self-supporting shape.

An object of the present invention is to be able to form a rigid self-supporting thermoplastic pipe that is reinforced with one or more circular braided reinforcing fabrics and which has a fluid impermeable region adjacent to, or forming, the bore of the pipe that is predominantly a thermoplastic material. In this embodiment of the invention it is possible to produce a pipe that is capable of being bent in a pipe bending machine of the type used for bending metal or metallic pipes without causing the braided fabric to become fluid permeable or porous during the pipe bending process.

A further object of the present invention is to provide a method of manufacturing a rigid self-supporting thermoplastic pipe that is reinforced with one or more circular braided reinforcing fabrics embedded in a thermoplastic matrix, using novel precursor tapes to form a fluid impermeable region adjacent the bore of the pipe, and novel tows of co-mingled thermoplastic filaments and reinforcing fibres that can be compressed to consolidate the thermoplastic matrix using an outer heat-shrink layer.

A further object of the present invention is to be able to form a rigid self-supporting thermoplastic pipe that is reinforced with circular braided reinforcing fabric embedded in a thermoplastic matrix, using novel precursor tapes as the braiding threads in order to produce a pipe that is capable of being bent in a pipe bending machine of the type used for bending metal pipes without causing the braided fabric to become fluid permeable or porous during the pipe bending process. In particular, an object of the present invention is to be able to make fibre reinforced fluid impermeable pipes that can be shaped and formed on a modified three-axis co-ordinate bending machine typically used to bend metal pipes.

A further object of the present invention is to provide a thermoplastic composite pipe that has a fluid-impermeable region at least at the bore of the pipe that is predominantly thermoplastic material.

A further object is to provide a composite pipe that is interchangeable with metal or metallic pipes in most circumstances where metal or metallic pipes or tubes are used.

According to one aspect of the present invention there is provided a method of manufacturing a fluid impermeable rigid composite pipe comprising the steps of:— a. providing a supporting mandrel that is shaped to define a bore of the pipe;

b. laying onto the outer circumferential surface of the mandrel one or more first tapes made of a thermoplastic material thereby to create a first region that is predominantly thermoplastic material adjacent the bore of the pipe;

c. providing a plurality of tows that comprise co-mingled reinforcing fibres and thermoplastic filaments;

d. weaving a plurality of the tows one or more circular braids and laying down the one or more of the circular braids on to the first layer: to form a second region;

e. applying to the outer surface of the second region a heat-shrinkable layer;

f. heating the product of steps (b) to (e) on the mandrel to a first temperature at which the thermoplastic materials of the one or more tapes and the tows melt and the heat-shrinkable layer shrinks radially inwards to consolidate the melted thermoplastic material to form a thermoplastic matrix in which the reinforcing fibres are embedded and a fluid impermeable thermoplastic rich region is formed at the bore of the pipe; and, g. allowing the pipe to cool to form a self supporting pipe.

Preferably the method comprises the further steps of placing at least a region of the pipe manufactured in step (g) in a heating means, heating at least a region of the pipe to a temperature at which the thermoplastic matrix softens without the pipe collapsing, fabricating heated region of the pipe to a desired finished state, and allowing the pipe to cool to retain its finished state The step of fabricating the pipe to the finished state may comprise placing the pipe of step (g) in a multi axis pipe bending machine that has a heating means, heating at least a region of the pipe to be bent to a temperature at which the thermoplastic matrix softens without the pipe collapsing, bending the heated pipe to a desired shape, and allowing the pipe to cool to retain its bent shape.

According to a further aspect of the present invention there is provided a composite pipe comprising a first thermoplastic rich region adjacent the bore of the pipe and a region surrounding the first region that comprises reinforcing fibres embedded in a thermoplastic matrix fibre when made by the method of any one of the attached method claims.

According to a further aspect of the present invention there is provided

Various preferences or alternatives are set out in the attached claims.

The present invention will now be described by way of example, with reference to the accompanying drawings, in which:—

Figure 1:
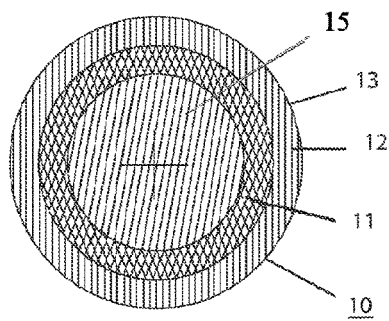
FIG. 1 is a cross-sectional view of a pipe or tube manufactured in accordance with the present invention.

Referring to FIG. 1 there is shown, schematically a cross sectional view of a rigid fluid tight composite pipe 10 or tube manufactured in accordance with the present invention. In the finished state the pipe 10 has a wall structure comprising a region 11 of 100% thermoplastic material that defines the bore of the pipe (and constitutes a fluid impermeable layer), surrounded by a circumferential zone 12 that is predominantly made of a braided fibre-reinforced fabric embedded in a thermoplastic matrix. The outer diameter of the pipe in the present example is between 0.25 inches (6 mm) up to 2.0 inches (50 mm). Clearly the invention is not restricted to this range of sizes, and the maximum diameter is wholly dependant on the size and design of the circular braiding machine.

In FIG. 1 there is shown an outer layer 13 formed by a heat shrinkable material which is used during the manufacturing process to compress and consolidate the thermoplastic matrix as explained hereinafter, The layer 13 is preferably removed from the pipe after it has been made, but could be left in placed if desired. In FIG. 1 the different regions 11 and 12 are shown as distinct zones for clarity but when the heat shrink layer 13 is heated to consolidate the thermoplastic matrix the two regions 11 and 12 merge at the interface between them.

The pipe 10 is effectively made in two steps namely, firstly by forming a semi-rigid unfinished "green" state pipe that is self-supporting, and then fabricating the pipe into the finished shape, such as, for example when making a bent composite pipe to replace a bent metal pipe, using a modified multi-axis pipe-bending machine. The pipe-bending machine is modified to provide a heating means operable to heat the pipe 10 at least in the region of where the pipe is to be bent to soften the thermoplastic material and enable the pipe to be formed to a desired shape. The heating means may comprise heated bending tools, radiant heaters, induction heaters (in this case the reinforcing fibres are those that are susceptible to induction heating, (such as for example carbon fibres)), by infra red heaters, or by ultrasonic or high frequency heating devices, When the pipe 10 is bent to the desired shape the pipe 10 is allowed to cool so as to retain the formed shape.

End fittings (not shown) for connecting the pipe or tube to other pipes or tubes, (whether metal or composite pipes or tubes), or to other structures, are formed on the ends of the pipe. This is preferably done when the pipe is in the "green" state but could be done when it is finished. A method of forming the end fittings is disclosed in our co-pending British Patent Application GB1412515.7.

The method of forming the pipe 10 comprises the steps of winding a thermoplastic tape 11 (or a tow of thermoplastic filaments) helically on to a temporary mandrel 15 using a conventional filament winding machine 1 that has a spool 2 for carrying the tape 11 (or tow) mounted on a carriage (not shown) that traverses to-and-fro along an axis parallel to the length of the mandrel 15.

Hereinafter the term "tape" when referring to tape 11 is intended to cover a tow of thermoplastic filaments or fibres as well as a tape made of a thermoplastic material. The tape 11 comprises 100% thermoplastic material (or a blend of thermoplastic materials) that is helically wound under tension on to a temporary heat resistant mandrel 15. The mandrel 15 is shaped and dimensioned to form bore of the finished pipe 10.

In the present example, the mandrel 15 is of circular cross-section with a diameter of 17 mm (0.75 inches). The cross-sectional shape of the mandrel 15 could be ogival, or oval, or elliptical, providing that the tape 14, or tow 14, can be wound tightly on the outer surface of the mandrel 15. The mandrel 15 is coated on its outer surface, prior to winding the tape 14 on to the mandrel 15, with a mould release agent (not shown), such as for example, a polytetrafluoroethylene (PTFE) based coating, to facilitate removal of the mandrel 15 from the inside of the pipe 10 later.

The tape 11 is wound helically on the outside of the mandrel 15 with a pitch of approximately 2.5 mm using a conventional filament winding machine to build up a first layer on the mandrel that is approximately 0.25 mm to 0.75 mm thick, or thicker. We prefer to use a 100% polyetheretherketone (PEEK) tape of the sort supplied by Victrex Corp under their registered trade mark APTIV. This tape is a film approximately 19 mm (0.75 inches) wide and 50 microns thick. Tapes of different widths (for example ranging from 10 mm to 50 mm wide or wider) and thicknesses (ranging from 50 microns to 100 microns or thicker) can be wound at different pitches to manufacture different size pipes 10.

When a sufficient thickness of thermoplastic has been laid up on the mandrel 15 to form the predominantly rich thermoplastic region 11, the mandrel is removed from the filament-winding machine 1 and inserted into a circular braiding machine 4 of the type made by OMA Srl under the model number 48/1-104HC. This is a horizontal-axis braiding machine that has two sets of carriers 17 (a) and 17(b) on to which the braiding threads, tows, or yarns are carried. There are twenty four carriers 17(a), 17(b) in each set; one set rotates clockwise about a common horizontal central axis 18 whilst the other set rotates anticlockwise about the same axis 18. The carriers 17(a), 17(b) are deflected in radial directions to cause the one or more of the braiding threads, tows or yarns of one set to pass under the braiding threads, tows or yarns of one or more of the other set.

A fibre reinforced thermoplastic circumferential zone 12 of the pipe 10 is manufactured by braiding a plurality of tows 16 of co-mingled thermoplastic filament and reinforcing fibres or filaments on to the outer surface of the mandrel 15. We prefer to use tows 16 comprising co-mingled carbon fibres and PEEK containing approximately 3000 carbon fibres and 2000 PEEK filaments as supplied by Concordia Inc. The tows 14 may comprise a blend of typically 60% to 80% by volume of continuous lengths of carbon fibres, or more co-mingled with PEEK filaments. It may be possible to use tows that are 100% continuous carbon fibres.

We prefer to form two or more braided layers 19 by braiding additional layers 19 onto previously braided layers 19. In the present example we build up a zone 12 of approximately 0.75 mm thick or more measured radially.

Figure 2:
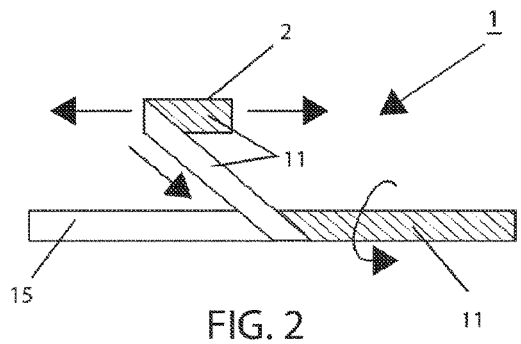
FIG. 2 shows schematically a conventional filament winding process for winding a first precursor tape on to a mandrel to form a region of the pipe shown in FIG. 1 adjacent the bore of the pipe.
Figure 3:
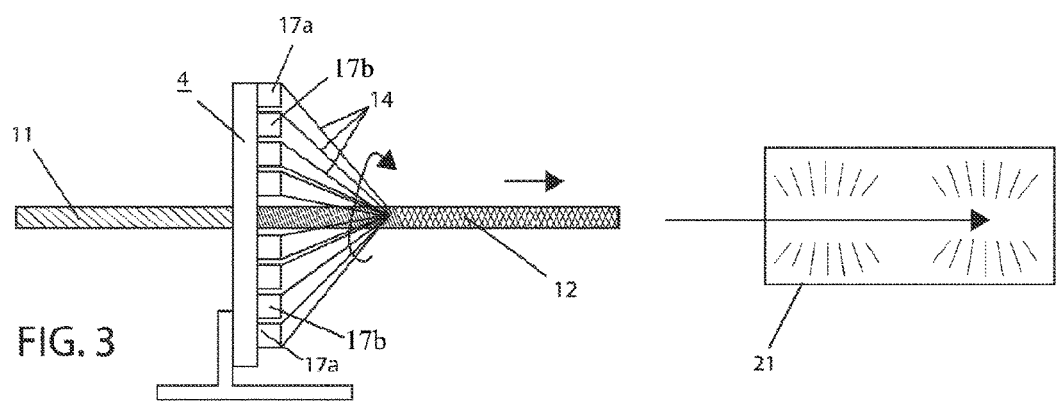
FIG. 3 shows schematically a conventional circular or Maypole braiding machine for manufacturing the fibre reinforced region of the pipe shown in FIG. 1 of the present invention.
Figure 4:
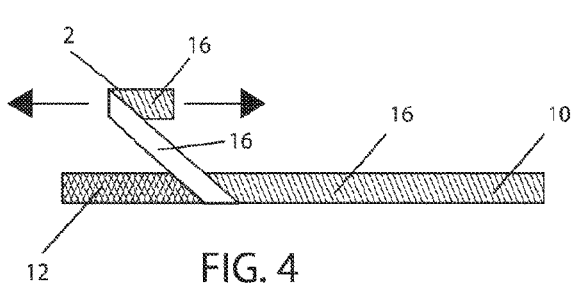
FIG. 4 shows schematically a conventional filament winding process for winding a heat shrinkable tape on the outside of the fibre reinforced region of the pipe in accordance with the present invention.

When a sufficient thickness layer 12 of fibre-reinforced braids have been formed on the first layer 11, the mandrel 15 with the two layers 11 and 12 formed on it is removed from the circumferential braiding machine, and the outer circumference is covered by a layer of a heat-shrink material 13 using a conventional filament-winding machine similar to that shown schematically in FIG. 2, except that instead of using a tape 11 we use a tape 16 that is a made of a heat-shrink material as shown in FIG. 4.

The preferred heat shrink material 13 is a polyimide tape 16 that is 19 mm (0.75 inches) wide and 50 microns thick. The heat-shrink tape 20 is wound under tension onto the outside of the of the braided layer or layers 19 that define region 12 at a pitch of 3.5 mm using a filament winding machine (shown schematically in FIG. 4). The tape 16 completely covers the outer surface of the layer 12 of braided reinforcement. Different widths or thicknesses of tapes 20 can be used for producing larger or smaller pipes 10.

In the present example, a discrete length of the pipe 10 together with the mandrel 15 is removed from the filament-winding machine 1 used to wind the tape 16 onto the mandrel 15, and placed in an oven or heating zone 21 and heated to a temperature in the region of 350° C. to 450° C. This causes the thermoplastic material (PEEK) to melt, and the heat shrink tape 16 to shrink onto the outer surface of the layer 12 and compress the molten PEEK and squeeze it into the carbon fibre braided reinforcement. This compression embeds the braided fabrics into the PEEK matrix and forms a thermoplastic rich region 11 at the bore of the pipe 10 to form the pipe shown in FIG. 1. The thermoplastic rich region 11 formed by the tapes 11 ensures that when the thermoplastic matrix is melted and consolidated, the thermoplastic matrix is not depleted in the reinforced region 12. Thus the resulting pipe 10 has a high strength region 12 and a fluid impermeable matrix at in the vicinity of the bore and throughout the thickness of the wall of the pipe 10.

The pipe 10 is then allowed to cool whilst on the mandrel 15 to retain its shape, and thereafter the pipe 10 is removed from the mandrel 15. The heat shrink layer 13 is preferably removed from the outside of the pipe 10, or it could be left in place on the pipe 10.

In the above-mentioned example, the thermoplastic material is PEEK but other thermoplastic materials could be used to form the matrix. For example the thermoplastic may be selected from one or more of polyetheretherketone (PEEK), polyaryletherketone (PAEK), polyetherketone (PEK), polyoxymethylene (POM), polyphenylenesulphide (PPS), polyethyleneimine (PEI), Polyacrylamide (PA), or a mixture of two or more of these thermoplastics.

Whilst it is preferred that the thermoplastic used in the tapes 11 is the same as that used in the tows 14 so as to maintain compatibility of the thermoplastics in the layers 11 and 12, it may be possible to make pipes 10 using tapes 11 that are a different polymer to that of the tows 14.

If desired, other natural or synthetic fibres or filaments may be used as the reinforcement of the matrix in the zone 12. For example, the reinforcement fibres may be carbon fibres, glass fibres, a poly-paraphenylene-terephtalamide-based fibre (for example, the type known as KEVLAR® (a Registered trademark of E. I. du Pont de Nemours and Company)), an aliphatic polyamide (such as for example Nylon (a Registered Trade Mark of E. I. du Pont de Nemours and Company), silicon carbide coated carbon fibres, synthetic or natural textile fibres. Whilst we prefer to use continuous fibres for reinforcement, it is possible to use discontinuous or chopped fibres (such as chopped carbon fibres) such as that used in the precursor tapes supplied by Schape Srl under the name TPFL thermopreg. Indeed, it is also possible to use monofilaments, woven threads or yarns (for example, Kevlar® spun or woven threads).

In the above-described method, a discrete length of pipe 10 is made, and this may be cut into shorter lengths if desired before fabricating the pipe into its final length or shape or bending the pipe 10 or pipes 10 into desired shapes. It is to be understood that the method described above may be modified to produce a continuous length of pipe 10 by effectively having a first filament winding station (not shown but corresponds to the winding machine 1) that winds the first tape 11 on to a mandrel 15 that extends into a circumferential heat treatment zone. The mandrel with the wound tape 11 is transported to one or more circular braiding stations (not shown but corresponds to the braiding machine 4) for braiding the tows 14 onto the wound tapes 11 on the mandrel 15. A further filament winding station (not shown but corresponding to the filament-winding machine 1) is used to wind the heat-shrink tapes 13 on to the braided layers. The mandrel 15 together with the layers 11, 12 and 13 is transported through a circumferential heating zone (not shown but corresponds to the oven 21) to heat the heat-shrink layer 13 and the layers 11 and 12 to compress and consolidate the thermoplastic matrix to form a pipe 10 as shown in FIG. 1.

The oven or heating zone 21 may comprise radiant thermal heaters, infrared heater, halogen light source heaters, ultrasonic heaters, or electrical induction heaters (where the reinforcing fibres or filaments are susceptible to induction heating). The pipe is then allowed to cool sufficiently to allow the pipe 10 to be pulled off the mandrel 15. The part finished pipe (i.e. in the "green state" is cut into discrete lengths ready to be further heat treated to enable bending in a multi-axis pipe-bending machine as described below.

Figure 5:
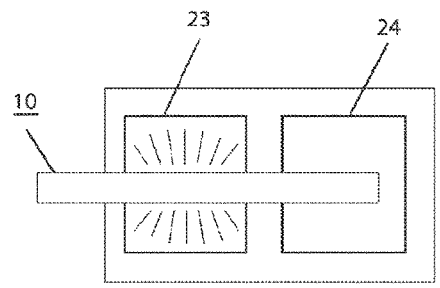
FIG. 5 shows schematically a conventional pipe-bending machine for bending a pipe modified to provide a heating zone for heating the pipe shown in FIG. 1 to soften the thermoplastic matrix and enable the pipe to be bent; and, FIG. 6 shows schematically a pipe manufactured in accordance with the present invention after it has been bent in the pipe-bending machine of FIG. 5.
Figure 6:
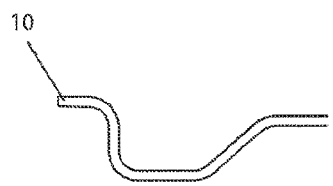

Referring to FIG. 5 there is shown a modified multi-axis pipe bending machine 23 of the type conventionally used for bending metal pipes. The pipe-bending machine 23 is of conventional design and operates under the control of a computer numerical control (CNC) system, but is modified to provide a heating means 24 in the vicinity of where one wishes to bend the pipe 10.

Referring to FIG. 5 there is shown a modified multi-axis pipe bending machine 23 of the type conventionally used for bending metal pipes. The pipe-bending machine 23 operates under the control of a computer numerical control (CNC) system, and is modified to provide a heating means 24 in the vicinity of where one wishes to bend the pipe 10.

The heating means 24 (shown schematically) may comprise heated bending tools or jigs of the pipe bending machine itself, or radiant thermal heaters, infra red heaters, halogen light source heaters, ultrasonic heaters, or electrical induction heaters (where the reinforcing fibres or filaments are susceptible to induction heating). The heating zone 24 is used to heat the pipe 10 to a temperature below that used to make the pipe 10, but high enough to soften the pipe without losing its rigidity. This enables the pipe 10 to be bent in the pipe-bending machine. This relatively simple modification, enables one to use conventional pipe bending technology that is conventionally used to bend metal or metallic pipes to be used for bending composite pipes 10 and thereby make almost identical shaped composite pipes 10 to those metal or metallic pipes that the composite pipe 10 is intended to replace.

End fittings may be fixed to the ends of the pipe 10 prior to, or after bending the pipe 10 in the pipe-bending machine.

The method of construction of the pipe or tube (10) described above is also suitable for the manufacture of hollow tubes (10) for use as, for example, torsion shafts or drive shafts for use in a variety of applications ranging from aircraft or machine control systems to vehicle power transmission chains. Suitable end fittings for coupling the shafts (10) to other shafts (whether metal or polymer composite shafts) or other structures will need to be fitted to the ends of the tubes (10).

The invention claimed is:

1. A method of manufacturing a fluid impermeable rigid composite pipe comprising the steps of:
   a. providing a supporting mandrel that is shaped to define a bore of the pipe;
   b. laying onto the outer circumferential surface of the mandrel one or more first tapes made of a thermoplastic material thereby to create a first region that is thermoplastic material adjacent the bore of the pipe;
   c. providing a plurality of tows that comprise co-mingled reinforcing fibres and thermoplastic filaments;
   d. weaving the plurality of tows to form one or more circular braids and laying down the one or more circular braids on to the first region to form a second region;
   e. applying to the outer surface of the second region a heat-shrinkable layer;
   f. heating the product of steps (b) to (e) on the mandrel to a first temperature at which the thermoplastic materials of the one or more first tapes and the plurality of tows melt, and the heat-shrinkable layer shrinks radially inwards to consolidate the melted thermoplastic material to form a thermoplastic matrix in which the reinforcing fibres are embedded, and a thermoplastic rich region is formed at the bore of the pipe; and
   g. allowing the pipe to cool to form a self supporting pipe.

2. The method of claim 1 wherein the step of heating the product of steps (b) to (e) employs a heater selected from a radiant thermal heater, an infra red heater, an halogen light source heater, an ultrasonic heater, or an electrical induction heater.

3. The method of claim 1 further comprising the steps of placing at least a region of the pipe as manufactured in step (g) in heating means, heating at least a region of the pipe to a temperature at which the thermoplastic matrix softens without the pipe collapsing, fabricating heated region of the pipe to a desired finished state, and allowing the pipe to cool to retain its finished state.

4. The method of claim 3 wherein the step of fabricating the pipe to the finished state further comprises the steps of placing the pipe of step (g) in a multi axis pipe bending machine that has a heating means, heating at least a region of the pipe to be bent to a temperature at which the thermoplastic matrix softens without the pipe collapsing, bending the heated pipe to a desired shape, and allowing the pipe to cool to retain its bent shape.

5. The method of claim 1 wherein the thermoplastic material is selected from one or more of polyetheretherketone (PEEK), polyaryletherketone (PAEK), polyetherketone (PEK), polyoxymethylene (POM), polyphenylenesulphide (PPS), polyethyleneimine (PEI), Polyacrylamide (PA), or a mixture of two or more of these thermoplastics.

6. The method of claim 1 wherein the reinforcing fibres are selected from carbon fibres, glass fibres, a poly-para-phenylene-terephtalamide-based fibre, an aliphatic polyamide, silicon carbide coated carbon fibres, synthetic textile fibres, natural textile fibres, or metal wires, or a mixture of two or more of these reinforcing fibres.

7. The method of claim 6 wherein the reinforcing fibres are selected from continuous fibres, discontinuous fibres, chopped fibres, monofilaments, woven threads, or yarns.

8. The method of claim 1 wherein the first tapes are between 10 mm and 50 mm wide and between 0.25 microns and 100 microns thick.

9. The method of claim 1 comprising the further step of fixing end fittings to one or more ends of the pipe.

* * * * *